US012785838B2

(12) United States Patent
Jonsson et al.

(10) Patent No.: US 12,785,838 B2
(45) Date of Patent: Nov. 3, 2026

(54) COOPERATIVE TIME-DIVISION DUPLEXING USING PRE-ALERT SIGNALING

(71) Applicant: Marvell Asia Pte Ltd, Singapore (SG)

(72) Inventors: Ragnar Hlynur Jonsson, Aliso Viejo, CA (US); Seid Alireza Razavi Majomard, Belmont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 60 days.

(21) Appl. No.: 19/060,696

(22) Filed: Feb. 23, 2025

(65) Prior Publication Data

US 2025/0274209 A1 Aug. 28, 2025

Related U.S. Application Data

(60) Provisional application No. 63/557,148, filed on Feb. 23, 2024.

(51) Int. Cl.
*H04J 3/06* (2006.01)
*H04J 3/14* (2006.01)

(52) U.S. Cl.
CPC .............. *H04J 3/0608* (2013.01); *H04J 3/14* (2013.01)

(58) Field of Classification Search
CPC .................................. H04J 3/0608; H04J 3/14
See application file for complete search history.

(56) References Cited

U.S. PATENT DOCUMENTS 11,714,478 B1 * 8/2023 Sedarat ................. G06F 1/3209 713/320
12,355,476 B2 * 7/2025 Abadi .................. H04B 1/1607
2006/0203896 A1 * 9/2006 Clausen .............. H04L 27/2607 375/219
2011/0261814 A1 * 10/2011 Matthews ............... H04L 47/28 370/389

(Continued)

FOREIGN PATENT DOCUMENTS

WO 2023230096 A1 11/2023

OTHER PUBLICATIONS

Machine translation of KR-20220045015-A (Year: 2022).*
European Search Report, European Patent Application No. EP25159388.5, dated Jun. 25, 2025.

*Primary Examiner* — Jean B Corrielus
(74) *Attorney, Agent, or Firm* — Meitar Patents LTD.; Daniel Kligler

(57) ABSTRACT

A physical layer (PHY) device, for use in an Ethernet network, includes a cable interface, a transmitter, a receiver and a processor. The cable interface connects to an Ethernet link for communicating with a peer PHY device. The transmitter transmits outbound signals that carry outbound data to the peer PHY device over the Ethernet link. The receiver receives inbound signals that carry inbound data from the peer PHY device over the Ethernet link. The processor (i) controls the transmitter to transmit, to the peer PHY device, an outbound pre-alert signal indicating that the PHY device is about to start transmitting the outbound signals, and (ii) in response to receiving, via the receiver, an inbound pre-alert signal from the peer PHY device during a period in which the peer PHY device is abstaining from transmitting the inbound signals, controls the transmitter to abstain from transmitting the outbound signals.

14 Claims, 3 Drawing Sheets

(56) References Cited

U.S. PATENT DOCUMENTS

| | | | | |
|---|---|---|---|---|
| 2014/0010130 | A1 | 1/2014 | Diab et al. | |
| 2015/0163045 | A1 | 6/2015 | Chang et al. | |
| 2020/0313840 | A1* | 10/2020 | Den Besten | H04J 3/1694 |

* cited by examiner

COOPERATIVE TIME-DIVISION DUPLEXING USING PRE-ALERT SIGNALING

CROSS-REFERENCE TO RELATED APPLICATIONS

This application claims the benefit of U.S. Provisional Patent Application 63/557,148, filed Feb. 23, 2024, whose disclosure is incorporated herein by reference.

FIELD OF THE DISCLOSURE

The present disclosure relates generally to digital communication, and particularly to methods and systems for cooperative Time-Division Duplexing (TDD) using pre-alert signaling.

BACKGROUND

Various communication systems and applications involve bidirectional communication over a shared medium. For example, some automotive Ethernet communication network use a single twisted-pair link for bidirectional communication between a pair of physical layer (PHY) devices. Various multiplexing schemes have been proposed for multiplexing the Ethernet signals of the two link directions. Example schemes include Time-Division Multiplexing (TDD) and Frequency-Division Multiplexing (FDD).

The description above is presented as a general overview of related art in this field and should not be construed as an admission that any of the information it contains constitutes prior art against the present patent application.

SUMMARY

A physical layer (PHY) device, for use in an Ethernet network, includes a cable interface, a transmitter, a receiver and a processor. The cable interface is configured to connect to an Ethernet link for communicating with a peer PHY device. The transmitter is configured to transmit outbound signals that carry outbound data to the peer PHY device over the Ethernet link. The receiver is configured to receive inbound signals that carry inbound data from the peer PHY device over the Ethernet link. The processor is configured to (i) control the transmitter to transmit, to the peer PHY device, an outbound pre-alert signal indicating that the PHY device is about to start transmitting the outbound signals, and (ii) in response to receiving, via the receiver, an inbound pre-alert signal from the peer PHY device during a period in which the peer PHY device is abstaining from transmitting the inbound signals, control the transmitter to abstain from transmitting the outbound signals.

In some embodiments, by controlling the transmitter in accordance with the outbound pre-alert signals and the inbound pre-alert signals, the processor is configured to cooperate with the peer PHY device in enforcing a multiplexing scheme whereby communication of data over the Ethernet link is unidirectional at a given time. In an embodiment, due to the communication of data being unidirectional at a given time, the receiver is configured to reconstruct the inbound data from the inbound signals without requiring echo cancellation.

In a disclosed embodiment, subsequent to transmission of the outbound pre-alert signal, the transmitter is configured to transmit a wake-up signal indicating that the PHY device is transitioning from a sleep mode to an active mode. In an example embodiment, the transmitter is configured to transmit a preamble between the outbound pre-alert signal and the wake-up signal.

In an embodiment, the transmitter is configured to begin transmission of the outbound signals at least a defined timeout after beginning transmission of the outbound pre-alert signal. In an embodiment, the transmitter is configured to pause transmission of the outbound signals no more than a defined timeout after receiving the inbound pre-alert signal.

There is additionally provided, in accordance with an embodiment that is described herein, a method in a physical layer (PHY) device in an Ethernet network. The method includes, using a transmitter of the PHY device, transmitting outbound signals that carry outbound data to a peer PHY device over an Ethernet link. Using a receiver of the PHY device, inbound signals that carry inbound data are received from the peer PHY device over the Ethernet link. The transmitter is controlled to transmit, to the peer PHY device, an outbound pre-alert signal indicating that the PHY device is about to start transmitting the outbound signals. In response to receiving, via the receiver, an inbound pre-alert signal from the peer PHY device during a period in which the peer PHY device is abstaining from transmitting the inbound signals, the transmitter is controlled to abstain from transmitting the outbound signals.

The present disclosure will be more fully understood from the following detailed description of the embodiments thereof, taken together with the drawings in which:

DETAILED DESCRIPTION OF EMBODIMENTS

Figure 1:
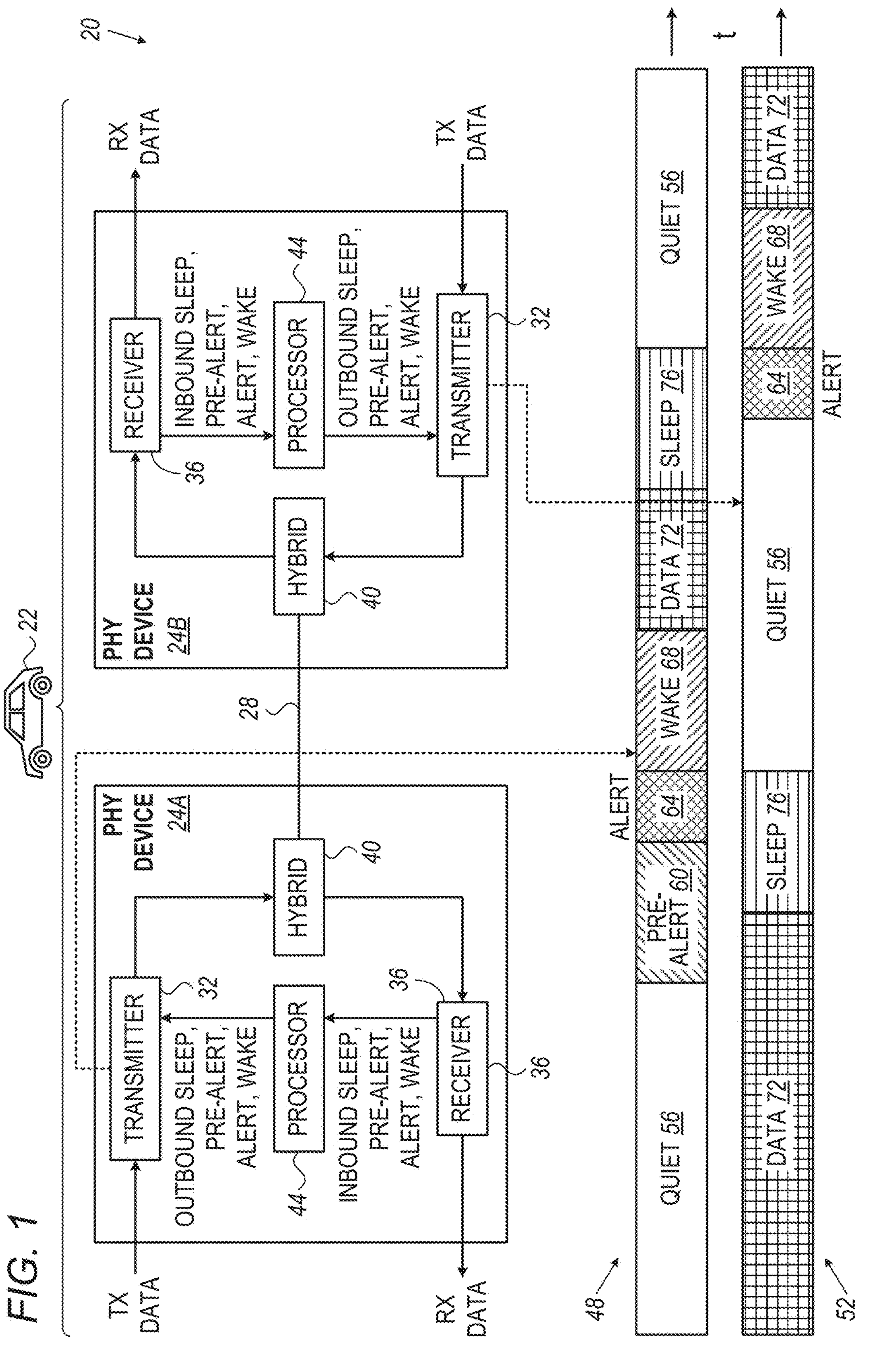
FIG. 1 is a block diagram that schematically illustrates an automotive Ethernet communication link, in accordance with an embodiment that is described herein.

Embodiments that are described herein provide improved methods and systems for multiplexing signals on bidirectional communication links. The disclosed embodiments are described herein in the context of a bidirectional Ethernet link in an automotive Ethernet network system. The disclosed techniques, however, are in no way limited to the automotive Ethernet use case, and can be used in any other suitable system or application and with any other suitable communication protocol. Examples include various industrial, enterprise and/or carrier networks.

In some embodiments, a pair of Ethernet physical layer (PHY) devices communicate with one another over an Ethernet link. Each of the PHY devices comprises a cable interface for connecting to the Ethernet link, a transmitter for transmitting outbound signals that carry outbound data to the peer PHY device, and a receiver for receiving inbound signals that carry inbound data from the peer PHY device.

Each of the PHY devices further comprises a processor that manages the operation of the PHY device. Among other tasks, the processor switches the PHY device alternately into and out of a "sleep mode" (also referred to as "low power idle (LPI) mode", "quiet mode" or "power saving mode") in order to save power. For example, the processor may apply power saving in accordance with the "Energy Efficient Ethernet" specifications. EEE is specified, for example, in IEEE Standard 802.3ch-2020, entitled "IEEE Standard for Ethernet—Amendment 8: Physical Layer Specifications and Management Parameters for 2.5 Gb/s, 5 Gb/s, and 10 Gb/s Automotive Electrical Ethernet", Jun. 30, 2020, which is incorporated herein by reference. See, for example, clauses 78 and 149.3.6. Alternatively, any other suitable sleep mode can be used.

In some embodiments, the processors of the PHY devices make use of the sleep mode mechanism to enforce a multiplexing scheme in which communication of data over the link is unidirectional at a given time. This multiplexing scheme is referred to herein as "cooperative TDD".

In some embodiments, the processors implement cooperative TDD using a novel signaling mechanism referred to as "pre-alert". By sending a pre-alert signal, a PHY device notifies the peer PHY device that it is about to start t transmitting outbound signals carrying outbound data. In response to receiving a pre-alert signal from the peer PHY device, a PHY device controls its transmitter to abstain from transmitting outbound signals that carry outbound data. By applying this logic, the two PHY devices cooperate in enforcing a multiplexing scheme in which data-carrying signals are transmitted only in one direction at a given time. In other words, the pre-alert signaling mechanism enables the PHY devices to avoid concurrent bidirectional transmission of data.

In some embodiments, the above condition (enforcing unidirectional transmission) applies to data-carrying signals but not necessarily to control signals. In an example embodiment, a PHY device will not transmit outbound data (i) while receiving inbound data from the peer PHY device, and (ii) after receiving an inbound pre-alert signal from the peer PHY device. A PHY device may, on the other hand, transmit control signals at any time. In other words, control signals in one direction may overlap data-carrying signals (as well as control signals) in the opposite direction. Control signals may comprise, for example, "sleep", "alert", "wake" and "refresh" signaling in accordance with EEE, or any other control signaling.

The disclosed cooperative TDD scheme is highly flexible, in the sense that it does not dictate any rigid duty cycle or frame structure. Rather, the disclosed scheme assigns transmission times adaptively, according to the actual bandwidth needs of each link direction.

Moreover, by avoiding concurrent bidirectional transmission of data, the disclosed cooperative TDD scheme simplifies the design of PHY devices and reduces their cost. For example, the need for echo cancellation circuitry may be obviated. Furthermore, in cooperative TDD there is no need to define one of the PHY devices as a master that controls the time-division scheduling of the link, thereby simplifying setting-up of the link.

FIG. 1 is a block diagram that schematically illustrates an automotive Ethernet communication link 20, in accordance with an embodiment that is described herein. Link 20 is typically installed in a vehicle 22, as part of an automotive Ethernet communication system. In alternative embodiments, link 20 may be used in any other suitable system or application.

Link 20 comprises a pair of Ethernet PHY devices 24A and 24B that communicate over an Ethernet cable 28. Cable 28 may comprise, for example, a twisted-pair cable, a coaxial cable, or any other suitable medium that is shared between both transmission directions of the link.

In the embodiment of FIG. 1, each of PHY devices 24A and 24B comprises a transmitter (TX) 32, a receiver (RX) 36, a hybrid 40 and a processor 44. Hybrid 40 serves as a cable interface for both transmission and reception. Transmitter 32 receives outbound data for transmission ("TX data") from a data source, e.g., a camera or other sensor, a switch or a controller, generates an outbound signal that carries the outbound data, and transmits the outbound signal via hybrid 40 over cable 28 to the peer PHY device. Receiver 36 receives an inbound signal, over cable 28 via hybrid 40. The inbound signal carries inbound data from the peer PHY device. Receiver 36 processes the received inbound signal so as to reconstruct and output the inbound data ("RX data").

In an embodiment, each of PHY devices 24A and 24B further comprises a processor 44 that manages the operation of the PHY device. Among other tasks, processor 44 (i) switches the PHY device into and out of sleep mode, in accordance with EEE, and (ii) cooperates with processor 44 of the peer PHY device in implementing the disclosed "cooperative TDD" scheme.

The bottom of FIG. 1 illustrates an example of signals transmitted by PHY devices 24A and 24B over cable 28, in an embodiment. A timeline 48 shows the signals transmitted by transmitter 32 of PHY device 24A. A timeline 52 shows the signals transmitted by transmitter 32 of PHY device 24B.

Some of the features seen in timelines 48 and 52 comprise EEE features. For example, timeline 48 (transmissions of PHY device 24A) begins with a QUIET period 56 in which PHY device 24A is in sleep mode (and therefore abstains from transmitting outbound signals). Before waking-up from sleep mode, PHY device 24A transmits an "ALERT" signal 64. ALERT signal 64 serves as a preamble, for training receiver 36 of PHY device 24B in preparation for receiving subsequent signals. Following ALERT signal 64, PHY device 24A sends a "WAKE" signal 68 indicating a transition from sleep mode to an active mode (also referred to as "data mode" or "normal mode"). Following WAKE signal 68, PHY device 24A transmits an outbound signal that carries outbound data, in a "DATA" period 72. After completing transmission of the outbound data, PHY device 24A transmits a "SLEEP" signal 76 indicating transition to sleep mode. SLEEP signal 76 is followed by another "QUIET" period 56.

A similar regime, in accordance with EEE, can be seen in timeline 52 (illustrating the transmission of signals from PHY device 24B, i.e., reception of signals in PHY device 24A). Timeline 52 begins with a DATA period 72 during which PHY device 24A receives an inbound signal carrying inbound data from PHY device 24B. Following DATA period 72, PHY device 24B sends a SLEEP signal 76 and goes into a QUIET period 56. Before waking up again, PHY device 24B sends an ALERT signal 64 followed by a WAKE signal 68, and then sends a DATA period 72.

Timelines 48 and 52 also demonstrate the use of a PRE-ALERT signal 60 in enforcing cooperative TDD, in an embodiment. In the present example, following the first QUIET period 56 in timeline 48, PHY device 24A sends a PRE-ALERT signal 60 indicating it is about to start transmitting an outbound signal carrying outbound data. In response to receiving PRE-ALERT signal 60, PHY device 24B initiates a transition to sleep mode (beginning by sending SLEEP signal 76). Due to the PRE-ALERT mechanism, DATA periods 72 on timeline 48 do not overlap DATA periods 72 on timeline 52. Transmission of data is unidirectional at any given time.

Timelines 48 and 52 illustrate a simple example of the cooperative TDD scheme, which is chosen solely for the sake of conceptual clarity. In alternative embodiments, cooperative TDD may be implemented in any other suitable way.

For example, in accordance with EEE, a PHY device (24A or 24B) may transmit short "REFRESH" signals within QUIET periods 56. The REFRESH signals typically comprise short bursts of predefined data values that are used by the peer PHY device to retain receiver 36 of synchronization, maintain lock of various loops, adapt filters, and for other purposes.

In some embodiments, processors 44 apply two timeout periods when implementing cooperative TDD:

"Tx_lpi_prealert_init"—A timeout defining the minimum time duration that a PHY device will wait between sending a pre-alert signal and starting transmission of outbound data. In other words, a PHY device will begin transmission of outbound signals, which carry outbound data, at least Tx_lpi_prealert_init after beginning transmission of an outbound pre-alert signal.

"Tx_lpi_force_sleep_init"—A timeout defining the maximal time period that a PHY device will take to pause transmission of outbound signals from the time it receives a pre-alert signal. In other words, a PHY device will go into a QUIET period no more than Tx_lpi_force_sleep_init after receiving an inbound pre-alert signal.

In some embodiments, processors 44 of PHY devices 24A and 24B mutually agree on a maximal burst length, i.e., a maximal duration of outbound data transmission allowed without yielding to a PRE-ALERT signal. Processors 44 may be pre-configured with the maximal burst length, or may negotiate the maximal burst length with one another. Applying a maximal burst length is important for limiting the maximal delay and maximal buffering space needed in the PHY devices. Applying a maximal burst length also enables guaranteeing given data rates in the two link directions, provided that the total bandwidth of link 28 is not exceeded.

In various embodiments, the disclosed technique can be implemented in symmetric links (in which the bandwidth requirements are similar in the two link directions) or in asymmetric links (in which the bandwidth requirements differ considerably between the two link directions).

One typical but non-limiting example of an asymmetric link is a link between a camera and a switch. In a specific example of a 10 Gbps IEEE 802.3ch-2020 Ethernet link, the downstream link direction (from the camera to the switch) has a data rate of 9.7 Gbps, whereas the upstream link direction (from the switch to the camera) has a data rate of only 50 Mbps. The downstream direction can handle approximately 0.25 μS between transmission bursts, whereas the upstream direction can handle approximately 27 μS between transmission bursts. In this example, Tx_lpi_prealert_init may be set to 0.25 μS in the camera-side PHY device and to 27 μS in the switch-side PHY device; and Tx_lpi_force_sleep_init may be set to 27 μS in the camera-side PHY device and to 0.25 μS in the switch-side PHY device. Alternatively, any other suitable settings can be used.

The configurations of communication link 20 shown in FIG. 1, and its components such as PHY devices 24A and 24B, are example configurations that are depicted solely for the sake of clarity. In alternative embodiments, any other suitable configurations can be used.

The various elements of the disclosed communication link and PHY devices may be implemented using dedicated hardware or firmware, such as using hard-wired or programmable logic, e.g., in one or more Application-Specific Integrated Circuits (ASIC) or Field-Programmable Gate Arrays (FPGA). Additionally, or alternatively, certain elements of the disclosed communication link and PHY devices may be implemented in software and/or using a combination of hardware and software elements. Elements that are not mandatory for understanding of the disclosed techniques have been omitted from the figure for the sake of clarity.

In some embodiments, certain functions of the disclosed PHY devices, e.g., processor 44, may be implemented in one or more programmable processors, e.g., one or more Central Processing Units (CPUs) or microcontrollers, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 2:
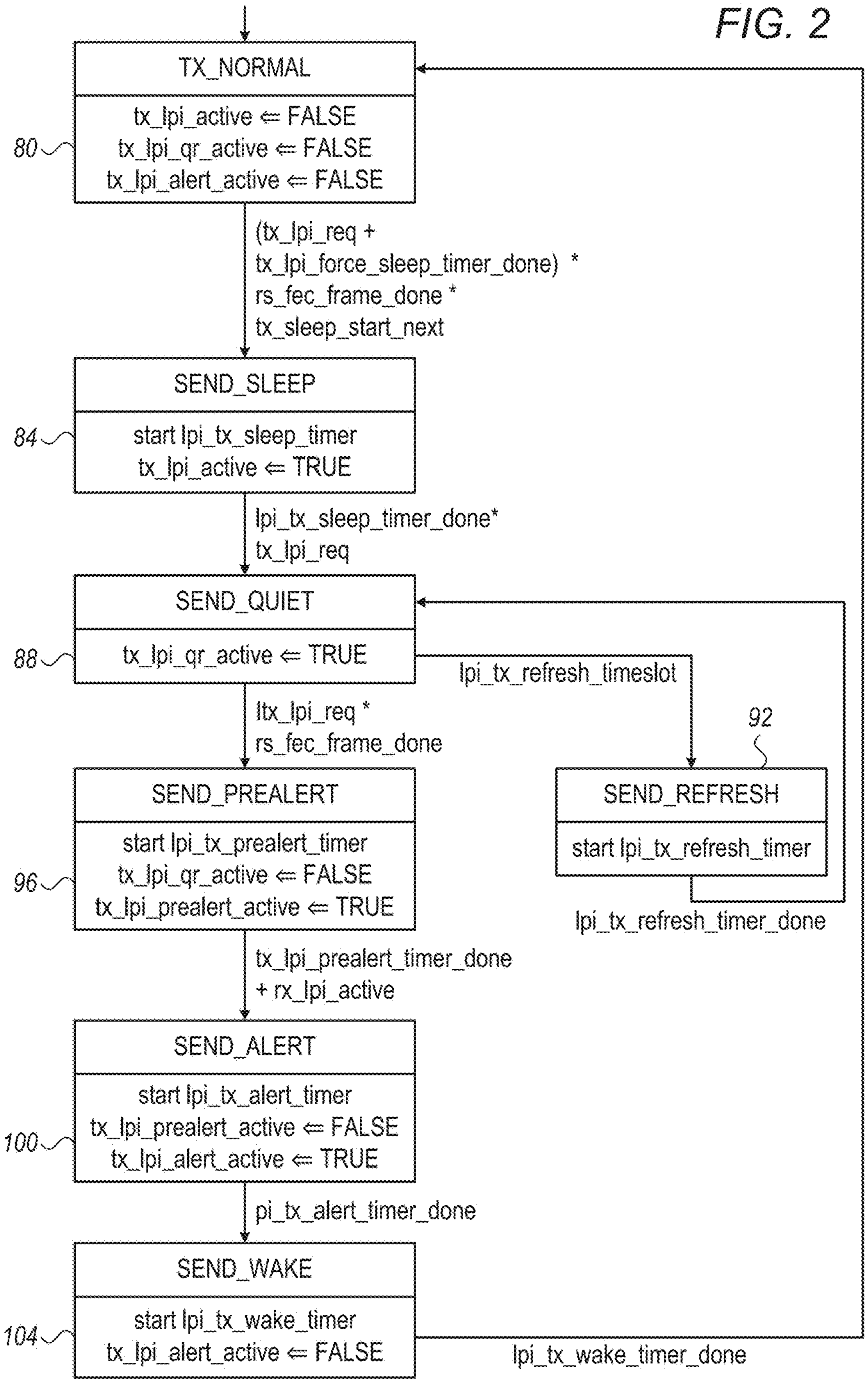
FIG. 2 is a state diagram and flow chart that schematically illustrates the transmit part of a method for cooperative TDD, executed by a physical layer (PHY) device in the communication link of FIG. 1, in accordance with an embodiment that is described herein.
Figure 3:
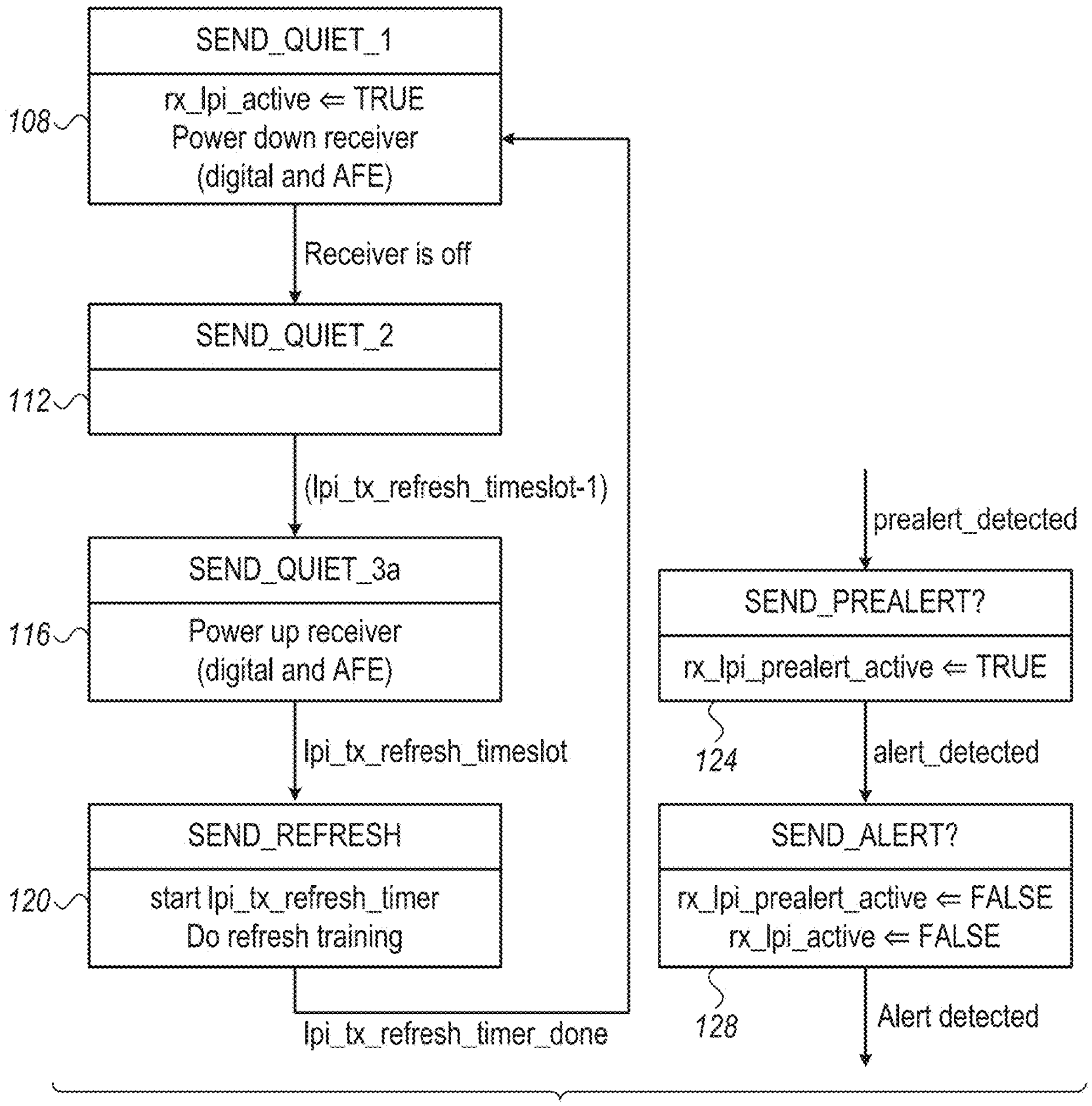
FIG. 3 is a state diagram and flow chart that schematically illustrates the receive part of a method for cooperative TDD, executed by a PHY device in the communication link of FIG. 1, in accordance with an embodiment that is described herein.

FIG. 2 is a state diagram and flow chart that schematically illustrates the transmit part of a method for cooperative TDD, in accordance with an embodiment that is described herein. FIG. 3 is a state diagram and flow chart that schematically illustrates the receive part of a method for cooperative TDD, in accordance with an embodiment that is described herein.

The state diagrams of FIGS. 2 and 3 typically are executed by each of PHY devices 24A and 24B of communication link 20. In both diagrams, each block illustrates a respective state (or stage of the method). Each state comprises (i) a title and (ii) a set of actions being performed, e.g., setting TRUE/FALSE values to various variables and/or starting of timers. Arrows in the figure illustrate transitions between the states (method stages). Each transition occurs a when respective transition condition is met. The transition condition is shown next to each arrow. The states and transitions typically are managed by processor 44 of the PHY device.

Most of the variables and timers in FIGS. 2 and 3 are defined in sections 149.3.7.2.2 and 149.3.7.2.3 of the IEEE 802.3ch-2020 standard, cited above. In an embodiment, newly defined variables and timers include the following:

"tx_lpi_force_sleep_timer_done"—Forces transmitter 32 to sleep mode when it has exceeded its maximum time, even if the transmitter is getting new data for transmission.

"tx_lpi_prealert_timer_done"—Starts the transmission of ALERT 64, even if the peer PHY device is not in QUIET period 56 ("rx_lpi_active").

"!tx_lpi_req*rs_fec_frame_done"—Transitions to SEND_PREALERT, instead of SEND_ALERT.

"prealert_detected"—Starts tx_lpi_force_sleep_timer; Waits for ALERT 64 to be detected.

"tx_lpi_prealert_timer"—A timer that, when done, forces the transmission of ALERT 64, even if the peer PHY device is not in QUIET period 56 ("rx_lpi_active").

"tx_lpi_force_sleep_timer timer*"—A timer that, when done, forces transmitter 32 to sleep mode when it has exceeded its maximum time, even if the transmitter is getting new data for transmission.

"tx_lpi_prealert_active variable"—A variable that indicates that PRE-ALERT signal 60 is being transmitted.

"rx_lpi_prealert_active variable"—A variable that indicates that PRE-ALERT signal 60 is being received/detected.

The method of FIG. 2 (transmit part) begins in a TX_NORMAL state 80. In this state the PHY device operates in an active mode, e.g., transmits outbound signals when provided with outbound data for transmission. In a SEND_SLEEP state 84, the PHY device sends a SLEEP signal 76 (indicating transition to sleep mode) and transitions to sleep mode.

In a SEND_QUIET state 88, the PHY device operates in sleep mode. During sleep mode operation, the PHY device periodically transitions to a SEND_REFRESH state 92 in which the PHY device transmits a REFRESH signal. After sending the REFRESH signal, the PHY device returns to SEND_QUIET state 88.

When preparing to begin transmitting outbound signals that carry outbound data, the PHY device transitions to a SEND_PREALERT state 96. In this state the PHY device sends a PRE-ALERT signal 60. As explained above, the PRE-ALERT signal notifies the peer PHY device that the PHY device is about to start transmitting outbound signals, and instructs the peer PHY device to abstain from transmitting.

The PHY device then transitions to a SEND_ALERT state 100, in which the PHY device sends an ALERT signal 64 (comprising a preamble). Subsequently, the PHY device transitions to a SEND_WAKE state 100, in which the PHY device sends a WAKE signal 68 (indicating a transition from sleep mode to an active mode). The PHY device then switches to the active mode, and transitions to TX_NORMAL state 80.

The flow of FIG. 3 (receive part) begins when the PHY device operates in sleep mode. In the present embodiment, operation in the sleep mode is divided into three states:

- A SEND_QUIET_1 state 108: In this state, the PHY device powers-down receiver 36, including both digital circuitry and Analog Front-End (AFE).
- A SEND_QUIET_2 state 112: In this state, the PHY device is in sleep mode, and counts the time until the next REFRESH signal is to be received from the peer PHY device.
- A SEND_QUIET_3a state 116: In this state, the PHY device powers-up receiver 36 to receive the REFRESH signal.
- A SEND_REFRESH state 120: In this state, the PHY device receives the REFRESH signal from the peer PHY device and trains the receiver loops. The PHY device then loops back to SEND_QUIET_1 state 108.

The right-hand side of FIG. 3 illustrates the process of switching from sleep mode to active mode. At a SEND_PREALERT? State 124 the PHY device detects a PRE-ALERT signal 60 sent by the peer PHY device. As explained above, the PRE-ALERT signal instructs the PHY device to abstain from transmitting outbound data, so that transmission of data over cable 28 will be 41 unidirectional.

After detecting the PRE-ALERT signal, the PHY device attempts detecting ALERT signal 64. Upon detecting the ALERT signal the PHY device transitions to a SEND_ALERT? State 128. The PHY device then transitions to the active mode in preparation for receiving data from the peer PHY device.

The method flows, states and transition conditions of FIGS. 2 and 3 are examples that are depicted solely for the sake of conceptual clarity. Any other suitable methods, states and transitions can be used in alternative embodiments.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A physical layer (PHY) device for use in an Ethernet network, the PHY device comprising:

- a cable interface, configured to connect to an Ethernet link for communicating with a peer PHY device;
- a transmitter, configured to transmit outbound signals that carry outbound data to the peer PHY device over the Ethernet link;
- a receiver, configured to receive inbound signals that carry inbound data from the peer PHY device over the Ethernet link; and
- a processor, configured to:
  - control the transmitter to transmit, to the peer PHY device, an outbound pre-alert signal indicating that the PHY device is about to start transmitting the outbound signals; and
  - in response to receiving, via the receiver, an inbound pre-alert signal from the peer PHY device during a period in which the peer PHY device is abstaining from transmitting the inbound signals, control the transmitter to abstain from transmitting the outbound signals.

2. The PHY device according to claim 1, wherein, by controlling the transmitter in accordance with the outbound pre-alert signals and the inbound pre-alert signals, the processor is configured to cooperate with the peer PHY device in enforcing a multiplexing scheme whereby communication of data over the Ethernet link is unidirectional at a given time.

3. The PHY device according to claim 2, wherein, due to the communication of data being unidirectional at a given time, the receiver is configured to reconstruct the inbound data from the inbound signals without requiring echo cancellation.

4. The PHY device according to claim 1, wherein, subsequent to transmission of the outbound pre-alert signal, the transmitter is configured to transmit a wake-up signal indicating that the PHY device is transitioning from a sleep mode to an active mode.

5. The PHY device according to claim 4, wherein the transmitter is configured to transmit a preamble between the outbound pre-alert signal and the wake-up signal.

6. The PHY device according to claim 1, wherein the transmitter is configured to begin transmission of the outbound signals at least a defined timeout after beginning transmission of the outbound pre-alert signal.

7. The PHY device according to claim 1, wherein the transmitter is configured to pause transmission of the outbound signals no more than a defined timeout after receiving the inbound pre-alert signal.

8. A method in a physical layer (PHY) device in an Ethernet network, the method comprising:

using a transmitter of the PHY device, transmitting outbound signals that carry outbound data to a peer PHY device over an Ethernet link;

using a receiver of the PHY device, receiving inbound signals that carry inbound data from the peer PHY device over the Ethernet link;

controlling the transmitter to transmit, to the peer PHY device, an outbound pre-alert signal indicating that the PHY device is about to start transmitting the outbound signals; and in response to receiving, via the receiver, an inbound pre-alert signal from the peer PHY device during a period in which the peer PHY device is abstaining from transmitting the inbound signals, controlling the transmitter to abstain from transmitting the outbound signals.

9. The method according to claim 8, wherein controlling the transmitter comprises cooperating with the peer PHY device in enforcing a multiplexing scheme whereby communication of data over the Ethernet link is unidirectional at a given time.

10. The method according to claim 9, wherein, due to the communication of data being unidirectional at a given time, receiving the inbound signals comprises reconstructing the inbound data from the inbound signals without requiring echo cancellation.

11. The method according to claim 8, further comprising, subsequent to transmission of the outbound pre-alert signal, transmitting a wake-up signal indicating that the PHY device is transitioning from a sleep mode to an active mode.

12. The method according to claim 11, further comprising transmitting a preamble between the outbound pre-alert signal and the wake-up signal.

13. The method according to claim 8, wherein transmitting the outbound signals comprises beginning transmission of the outbound signals at least a defined timeout after beginning transmission of the outbound pre-alert signal.

14. The method according to claim 8, wherein transmitting the outbound signals comprises pausing transmission of the outbound signals no more than a defined timeout after receiving the inbound pre-alert signal.

* * * * *